United States Patent
Hesse et al.

(10) Patent No.: US 12,511,224 B2
(45) Date of Patent: Dec. 30, 2025

(54) ANALYZING AUTOMATION SOFTWARE OF AN AUTOMATION DEVICE

(71) Applicant: Lenze SE, Aerzen (DE)

(72) Inventors: Peter Hesse, Hameln (DE); Andreas Roettger, Minden (DE)

(73) Assignee: Lenze SE, Aerzen (DE)

( * ) Notice: Subject to any disclaimer, the term of this patent is extended or adjusted under 35 U.S.C. 154(b) by 240 days.

(21) Appl. No.: 18/104,449

(22) Filed: Feb. 1, 2023

(65) Prior Publication Data

US 2023/0251957 A1    Aug. 10, 2023

(30) Foreign Application Priority Data

Feb. 3, 2022  (DE) .......................... 102022102616.7

(51) Int. Cl.
- *G06F 11/36*  (2025.01)
- *G06F 11/14*  (2006.01)
- *G06F 11/3668*  (2025.01)

(52) U.S. Cl.
CPC ...... *G06F 11/3672* (2013.01); *G06F 11/1451* (2013.01)

(58) Field of Classification Search
None
See application file for complete search history.

(56) References Cited

U.S. PATENT DOCUMENTS

| | | | | |
|---|---|---|---|---|
| 6,073,123 A * | 6/2000 | Staley | .................. | G06F 21/101 705/52 |
| 10,007,783 B2 * | 6/2018 | Schoenemann | ....... | G06F 21/552 |
| 10,896,260 B2 * | 1/2021 | Nadgowda | ............ | H04L 41/082 |
| 10,922,303 B1 * | 2/2021 | Bruck | ................. | G06F 16/2365 |
| 11,218,297 B1 * | 1/2022 | Hegg | .................... | H04L 9/0894 |
| 2003/0014498 A1 * | 1/2003 | Kreidler | ............. | G05B 19/4063 709/217 |
| 2003/0023336 A1 * | 1/2003 | Kreidler | ............. | G05B 19/4183 700/174 |
| 2006/0259154 A1 * | 11/2006 | Hood | ................. | G05B 19/4188 700/1 |
| 2007/0112773 A1 * | 5/2007 | Joyce | ........................ | G06F 8/64 707/999.009 |

(Continued)

FOREIGN PATENT DOCUMENTS

| CA | 2778710 A1 * | 5/2011 | ............. G06F 21/55 |
|---|---|---|---|
| DE | 102 28 142 A1 | 2/2003 | |

(Continued)

*Primary Examiner* — Philip Wang
(74) *Attorney, Agent, or Firm* — Westborough IP Group, LLC

(57) ABSTRACT

The system described herein relates to analyzing an automation software of an automation device, in particular of a programmable logic controller, of a technical device, in particular of the machine and/or of the installation. The automation device is enabled to execute automation technology tasks using automation software that is executable by the automation device, where the automation software includes programs and data with which the programs interact. A first version of the automation software stored in a data memory of the automation device at a first point in time is compared with a second version of the automation software stored in the data memory of the automation device at a second point in time by analysis software.

24 Claims, 1 Drawing Sheet

(56) References Cited

U.S. PATENT DOCUMENTS

| | | | |
|---|---|---|---|
| 2009/0235232 A1* | 9/2009 | Malik | G06Q 10/06 |
| | | | 717/120 |
| 2013/0254889 A1* | 9/2013 | Stuntebeck | G06F 21/6218 |
| | | | 726/23 |
| 2016/0021121 A1* | 1/2016 | Cui | H04L 63/20 |
| | | | 726/1 |
| 2016/0034688 A1 | 2/2016 | Schoenemann | |
| 2018/0336522 A1* | 11/2018 | Balestrazzi | G06F 16/2358 |
| 2019/0180026 A1* | 6/2019 | Almeida | G06F 8/61 |
| 2020/0301882 A1* | 9/2020 | Pogde | G06F 11/1451 |
| 2020/0349009 A1* | 11/2020 | Samuel | G06F 11/1469 |
| 2022/0126807 A1* | 4/2022 | Oehler | F04B 17/03 |
| 2022/0187992 A1* | 6/2022 | Malakapalli | G06F 3/0659 |

FOREIGN PATENT DOCUMENTS

| | | | | |
|---|---|---|---|---|
| EP | 2 980 662 A1 | | 2/2016 | |
| EP | 3525126 A1 * | 8/2019 | | G06F 21/52 |
| EP | 4105741 A1 * | 12/2022 | | G05B 19/0426 |
| WO | WO-2021185447 A1 * | 9/2021 | | G06F 21/52 |

\* cited by examiner

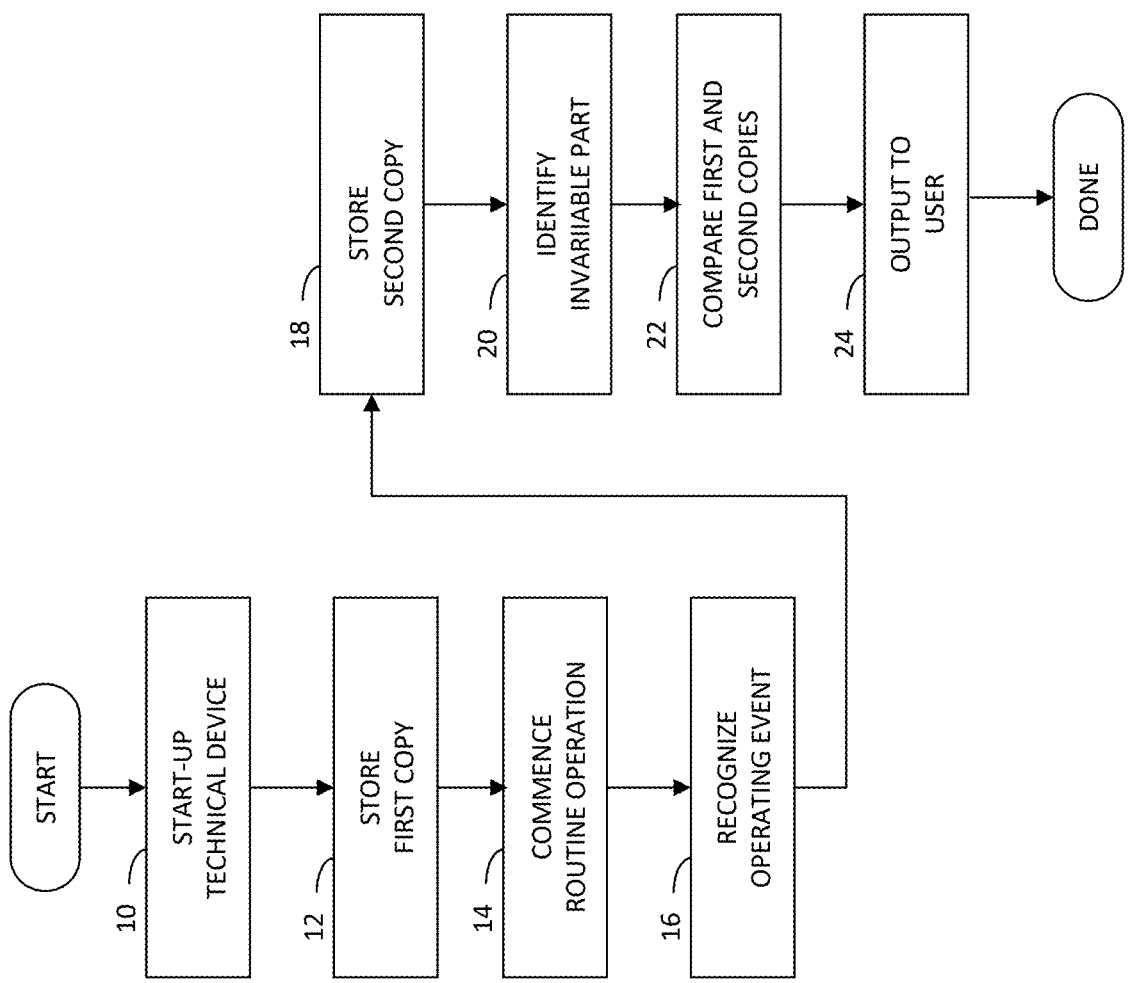

ANALYZING AUTOMATION SOFTWARE OF AN AUTOMATION DEVICE

TECHNICAL FIELD

The system described herein relates to analyzing automation software of an automation device.

BACKGROUND

Automation devices may serve to automate technical devices, such as machines and/or installations. The degree of automation ranges from individual open-loop and/or closed-loop control technology tasks, such as ensuring a constant rotational speed of a drive, for example, up to highly complex automation tasks which involve controlling, for example, entire production lines with a plurality of machines and/or installations connected in terms of process engineering.

The high potential currently afforded by automation technology is made possible in particular by virtue of contemporary automation devices being enabled to execute automation technology tasks by way of automation software. This is the case for example for automation devices in the form of programmable logic controllers, which are also referred to as "Programmable Automation Controller (PAC)", particularly if the programmable logic controllers can execute complex automation tasks, or process control systems.

Through the use of software executed by the automation device instead of the earlier electronic automation devices, the functionality of which was predefined by, generally invariable, circuitry interconnection of electronic components, the automation devices based on the use of executable automation software can adapt significantly better to different automation tasks. In practice, as a result, the automation devices also make it possible to manage significantly more complex automation tasks.

It is quite understandable that the increasing complexity of the requirements and possibilities in the field of automation technology necessitates ever more complex automation software of the automation devices. In this case, the respective software contains a multiplicity of parts specific to a particular type of automation device, or technical device which the automation device is part of, or even to a particular use of a specific automation device or of the corresponding technical device.

However, the high degree of flexibility and complexity increases the difficulty of fault finding if undesired changes to the automation software occur. This situation is made worse, moreover, by the fact that there are parts of the automation software which by nature are subject to changes in the course of operation of the automation device. Furthermore, owing to the increasing degree of networking of such automation devices, there is increasingly the risk of such undesired changes to the automation software being brought about by accesses to the automation devices via data connections. This can happen unintentionally, for example as a result of errors made during principally authorized accesses to the automation device via data connections. However, there is also increasingly the risk of targeted attacks causing an unauthorized change to the automation software. Both scenarios may result in considerable damage to capital goods and/or even to health and life of humans.

SUMMARY OF THE INVENTION

The system described herein provides automation software of an automation device which allows rapid recognition of a possible intentional and/or unintentional manipulation of the automation software.

The automation device described herein can be for example a programmable logic controller. In principle, the system described herein is suitable for analyzing the automation software of any automation device which is enabled to execute automation technology tasks using automation software that is executable by the automation device. The automation device can also be a safety control device, a so-called functional safety controller, a sensor and/or an actuator which has corresponding integrated automation software, such as firmware, for example, to facilitate independent execution, a computer used for automation tasks, a network device, such as a router or a switch, a programmable logic controller and/or a process control system.

A first version of the automation software stored in a data memory of the automation device at a first point in time is compared with a second version of the automation software stored in the data memory of the automation device at a second point in time by analysis software.

The data memory can be a nonvolatile memory, such as a hard disk and/or a memory card, for example, but also a volatile memory, such as a main memory, for example.

It has been found in connection with the system described herein that it is possible, by way of such a comparison of two versions of the automation software using analysis software, to carry out a substantially automated and thus efficient analysis of the automation software which is suitable for recognizing problematic alterations of the automation software.

That is based in particular on the insight that the alterations of the automation software which prove to be problematic in practice often occur in parts of the automation software which are not subject to alterations between specific points in time during routine operation of the automation device. This makes it possible, in particular, to recognize alterations in parts of the automation software which are not subject to alterations between specific points in time using analysis software.

The automation software includes both programs and data with which the programs interact. The data can be in particular data which are processed by the programs, i.e., in particular are read in, and also data which are generated by the programs, i.e., stored in the data memory by the programs.

The system described herein can provide for the analysis software to be executed on a separate computer connected to the automation device via a data connection. This can be advantageous for example if the analysis involves the analysis of a possible attack and the need for evidence preservation measures should be expected. In particular, a dedicated forensic computer can be involved in this context. In case of doubt, a dedicated forensic computer should be understood to mean a computer which is set up in such a way that it allows the system described herein to operate while complying with forensic standards.

Alternatively and/or supplementarily, the analysis software can be software which is executed on the automation device or some other automation device connected to the automation device via a data connection. Such analysis software can be a service, for example. In this regard, the analysis software can be executed for example as a service on a programmable logic controller, and an automation device in the form of an actuator connected to the controller via a data connection can be used for the analysis of the automation software. This has the advantage that no additional hardware components are required for providing the system described herein.

Alternatively and/or supplementarily, the analysis software can be executed by a cloud computing system. This has the advantage of a high degree of spatial independence; in particular, the analysis can be carried out "remotely" in the short term.

Particularly if the analysis software is executed on a cloud computing system and/or an automation device, the analysis software can be executed in a virtual environment, for example by way of container virtualization. This can be done using "Docker" software, for example. Alternatively and/or supplementarily, it is possible to execute the analysis software on a virtual machine.

The system described herein can provide for the analysis software to store a first copy of the first version of the automation software and/or a second copy of the second version of the automation software in a memory area provided therefor. Advantageously, the first copy and/or the second copy are/is used for the comparison. In this case, it is particularly advantageous if the comparison is made between the first copy and the second copy.

The advantage here is that no further accesses to the automation device are required for carrying out the actual analysis. The automation software need only be read out once for each version which is intended to be used for the comparison. Accordingly, the first copy is read out in particular at the first point in time and the second copy is read out in particular at the second point in time. A further advantage of this procedure is that alterations of the automation software stored on the automation device cannot have any further effect on the copies once the copies have been produced.

The system described herein can provide for the access to the automation software to be effected by the analysis software using a write blocker. In particular, the creating of the first copy and/or the second copy can be effected using a write blocker. A write blocker should be understood to mean hardware and/or software which ensures that the access to the medium to be read, in the present case in particular to the data memory of the automation device, is effected purely as a read access. This ensures that the automation software stored on the data memory of the automation device is not altered when the copy is produced. This, on one hand, affords the advantage of thus ensuring that no potentially harmful change is brought about in the automation software stored on the data memory of the automation device. Furthermore, the fact that such a possible alteration is excluded by the write blocker is advantageous if the results of the analysis are intended to be used as evidence, for example in legal proceedings.

The system described herein can provide for the copy of the automation software stored in the memory area provided to be protected against changes. Alternatively and/or supplementarily, the system described herein can provide for the copy of the automation software stored in the memory area provided to be protected against unrecognized changes. Protection against unrecognized changes should be understood to mean in particular that although a change of the copy is possible, the presence of such a change can subsequently be recognized. In particular, a hash function can be used for protecting the copy of the automation software against changes and/or unrecognized changes. Such a hash function or mapping function makes it possible to calculate hash values with respect to the copies stored in the memory area provided. In this case, it is not possible, or it is at least virtually impossible in practice, to deduce from the hash values the data underlying the hash values. Such hash functions are also referred to as cryptological hash functions or cryptographic hash functions. An alteration of the stored copy can easily be recognized in this way since the data which form the copy no longer "match" their hash values if the copy is altered. The question whether the data have been altered can then be checked in a simple manner by the hash value being calculated again for the data and being compared with the stored hash value.

Alternatively and/or supplementarily, the copy of the automation software stored in the memory area provided can be protected against changes and/or unrecognized changes using an authentication feature. Such an authentication feature makes it possible in particular to recognize the cause of a change to the copy. In particular, the authentication feature makes it possible to recognize the analysis software as the cause of a change to the copy. This makes it possible to ensure that the data stored in the copy have actually been stored by the analysis software.

The authentication feature can be for example a certificate according to the X.509 standard. Such a certificate can be used for example as a key for signing the copy. Such signing makes it possible to check whether the copy has been created by the certificate owner. The certificate owner is in this case the user of the analysis software, in particular.

Alternatively and/or supplementarily, the copy can be stored in an encrypted manner. The advantage is that encrypted data cannot be deliberately manipulated since the encrypted data are not readable without prior decryption. A certificate, for example a certificate according to the X.509 standard, can likewise be used as a key for the encryption.

The first copy and/or the second copy can be a forensic duplicate of a data carrier and/or main memory of the automation device. A forensic duplicate is an unaltered physical one-to-one copy of the corresponding data carrier and/or main memory. A copy which satisfies the forensic duplicate requirement is advantageous particularly if the copy is intended to be used in the context of presentation of evidence, for example in the context of legal proceedings. In this case, the forensic duplicate can be in particular the forensic duplicate of a hard disk of the automation device and/or of a memory card accommodated in the automation device. A further advantage of such a forensic duplicate is that the latter can be reconstructed and analyzed by being transferred into a virtual environment.

The automation software can be an operating system and/or a part of an operating system. The part of the operating system can be in particular a kernel of an operating system. Alternatively and/or supplementarily, the part of the operating system can be a library. On account of the central importance of operating system elements for the function of the automation device, the above elements of an operating system are particularly sensitive parts of automation software and thus preferred subject matter of the system described herein for analyzing the automation software.

The automation software can include a runtime environment and/or part of a runtime environment. Runtime environments serve in particular to allow the execution of programs written for the respective runtime environment. This can be for example a runtime environment for visualization software, in particular web-based visualization software. Runtime environments make it possible in particular to incorporate software from third-party providers in automation software. The software then only needs to conform to the requirements of the runtime environment; the third-party provider does not require deepening knowledge about the automation device or the other automation software of the automation device, but rather can design software of the provider in a suitable manner for the runtime environment. Such runtime environments are therefore likewise of central importance in automation software of the type described herein and are therefore subject matter of the system described herein.

The part of the runtime environment can be in particular a runtime library, a standard library, a programming interface and/or a runtime variable.

Alternatively and/or supplementarily, the system described herein can provide for the automation software to include configuration data. Configuration data should be understood to mean such data which relate to technical design features of the automation device and/or of the technical device which the automation device is part of. Using such configuration data, the automation software of the automation device is adapted to the respective automation device and/or the respective technical device which the automation device is part of. In this case, the design features can be in particular such technical design features which are identical for all automation devices and/or technical devices of a specific type. The technical design features can be in particular an axis configuration of a drive system, in particular the number of axes of a drive system, and/or the presence of an optional module of a technical device, for example the presence of an extraction device and/or a quality control device.

Alternatively and/or supplementarily, the system described herein can provide for the automation software to include parameterization data. Parameterization data should be understood to mean such data which relate to technical parameters of the automation device and/or of the technical device which the automation device is part of. The technical parameters are parameters which are individually defined for a specific automation device and/or technical device. By way of example, the technical parameters can be individually defined in order to take account of or compensate for manufacturing tolerances during the production of the technical device. The technical parameters can therefore be in particular parameters which have been determined by measurements on the respective technical device. The technical parameters can relate in particular to dimensions, such as reference positions, stop positions, pushbutton positions and/or axis lengths, in particular of industrial robots.

The automation software can include application data. In this context, application data should be understood to mean such data which relate to the specific use of the automation device and/or of the technical device which the automation device is part of. This can mean in particular that the application data are dependent on the respective use of an individual technical device. For each individual technical device, the respective use can differ from other individual devices of the same type. The use can involve in particular programs for operation sequences of the technical device, controller parameters, limit values, for example for permissible rotational speed, torque, acceleration, velocity and/or jerk, target values, for example for rotational speed, torque, acceleration, velocity and/or jerk, process parameters, such as temperatures, pressures, concentrations, mixing ratios, mass flow rates and/or volumetric flow rates.

The system described herein can in particular provide for the analysis software to identify an invariable part of the automation software, which is not subject to any alterations during routine operation of the automation device. Alternatively and/or supplementarily, the system described herein can provide for the analysis software to identify a variable part of the automation software, which is subject to alterations during routine operation of the automation device.

The identification of variable and/or invariable parts of the automation software makes it possible for parts of the automation software to be purposefully considered and/or disregarded during the comparison, carried out by the analysis software, of the first version of the automation software and the second version of the automation software. As a result, on one hand, the set of data to be compared can be reduced and the process can thus be accelerated. Furthermore, the sample space can thus be reduced from the outset by those alterations of the automation software for which an alteration is possible or should be expected anyway during regular operation. As a result, for every alteration found, the probability increases that the alteration is actually an alteration relating to parts of the automation software which should not have been altered and thus constitute potential causes of the problem addressed by the analysis and/or risks for the further operation of the technical device.

The system described herein can provide in particular for the comparison to be effected only on the basis of the invariable part of the automation software which has been identified by the analysis software. Alternatively and/or supplementarily, the system described herein can provide for the invariable part of the automation software which has been identified by the analysis software to be disregarded when effecting the comparison. Such a subset consideration of the automation software accordingly results in a high efficiency of the analysis.

The system described herein can provide in particular that during the identification of the invariable part of the automation software, operating systems, parts of an operating system, a runtime environment, parts of a runtime environment, configuration data, parameterization data, application data, hardware-bound addresses and/or issuers of a certificate are assigned to the invariable part of the automation software.

It has been found that the software parts listed above are typically not subject to alterations during routine operation of an automation device of the type in question.

The invariable part of the automation software can therefore be identified in particular by the analysis software searching for such software parts of the automation software of the type above and the software parts being assigned to the invariable part of the automation software by the analysis software. For the purpose of identifying the invariable part of the automation software, the system described herein can provide for storing a priori knowledge regarding the type of software parts that are assigned to the invariable part of the automation software. A priori knowledge should be understood to mean in particular such knowledge which does not arise at the time of execution of the analysis software, but rather is stored in the analysis software before the method is carried out. Alternatively and/or supplementarily, the system described herein can provide for using comparison values which allow an identification of the invariable part of the automation software. The comparison values can be in particular hash values of software parts, for example of parts of an operating system. The a priori knowledge and/or the hash values can be stored in particular in the analysis software and/or a resource, for example a database, which is used by the analysis software.

Alternatively and/or supplementarily, the system described herein can provide that during the identification of the variable part of the automation software, the current time of day, keys, certificates, non-hardware-bound addresses and/or data, cache files are assigned to the variable part of the automation software.

It has been found that the software parts listed above are typically subject to alterations during routine operation of an automation device of the type in question. The variable part of the automation software can therefore be identified in particular by the analysis software searching for such software parts of the automation software of the type above and the software parts being assigned to the variable part of the automation software by the analysis software. For the purpose of identifying the variable part of the automation software, the system described herein can provide for storing a priori knowledge regarding the type of software parts that are assigned to the variable part of the automation software.

The system described herein can provide for the first point in time and/or the second point in time to be chosen depending on the occurrence of a specific event.

The first point in time can be a point in time before the recognition of a security-relevant event by an information technology security system, in particular a firewall, an intrusion detection system and/or a virus scanner. The second point in time is in particular a point in time after the recognition of the security-relevant event.

In this context, a firewall should be understood to mean hardware and/or software which checks and in particular regulates the data connections of the automation device. A virus scanner checks files stored in data memories of the automation device. The virus scanner can transfer into quarantine and/or erase in particular files which are recognized as harmful and/or potentially harmful by the virus scanner. An intrusion detection system can be designed to check data, in particular data transmitted via data connections, with regard to content of the data connections. In particular, it is possible to check whether contents known to be harmful are included, or contents which should be classified as potentially harmful on account of properties of the contents, such as emails from fake senders, for example. Such checks are also referred to as signature-based checks. Alternatively and/or supplementarily, the intrusion detection system can be designed to carry out a check for unusual events, for example whether a user at a corresponding interface logs on at the automation device via a data connection in quick succession from locations that are geographically far apart from one another, for example firstly from Germany and then from a geographically distant foreign country within a few minutes.

The recognition of such a security-relevant event can be an indication of a jeopardization of the operation of the technical device or of the technical device itself. The system described herein for analyzing the automation software allows effects of such an event on the automation software to be recognized and identified in a simple and rapid manner. Depending on the result, measures can then be initiated promptly and purposefully, which on the one hand can allow an early reaction to a potentially dangerous intervention in the first place, and on the other hand can help to avoid costs resulting from excessive measures, for example on account of premature operation interruptions if an attempted attack subsequently turns out to be harmless.

Alternatively and/or supplementarily, the first point in time can be a point in time between the conclusion of a start-up and the commencement of the routine operation of the automation device and/or of the technical device which the automation device is part of. It has been found that automation software of the type described herein, at least in large part, is subjected to comparatively few changes during routine operation. Therefore, the point in time between the conclusion of a start-up and the commencement of the routine operation of the automation device is particularly well suited as the first point in time since the first version of the automation software stored at this point in time reproduces exactly the state of the automation software which, after the conclusion of the start-up, was regarded as suitable for continuous operation. A copy of the automation software that was created at the point in time between the conclusion of a start-up and the commencement of the routine operation of the automation device can accordingly be used as a reference version for future comparisons by the analysis software.

The second point in time can be in particular a point in time after the transfer of a security copy of the automation software into the automation device. The transfer of a security copy constitutes a simple and comparatively robust measure for re-establishing the desired state of an automation software. However, this involves the risk that the desired state will not be exactly re-established during the transfer of the security copy. On one hand, this may have technical causes; on the other hand, however, human error sources also play a part here, for example if an incorrect version of a security copy or even an incorrect security copy belonging to a different automation device is mistakenly selected. In this case, the system described herein allows rapid recognition of the error and in so doing can avert damage for example in the event of resumption of operation of the technical device with the incorrect automation software.

Alternatively and/or supplementarily, the system described herein can provide for the analyses described above to be executed in a time-controlled manner by the analysis software. In this regard, the system described herein can provide, for example, for an analysis of the automation software to be carried out at specific time intervals or after specific durations of use of the automation device and/or the technical device which the automation device is part of.

The system described herein can provide for differences, determined during the comparison, between the first version of the automation software and the second version of the automation software, in particular differences between the invariable part of the first version of the automation software and the invariable part of the second version of the automation software, to be signaled via a user interface, in particular via an optical display such as a screen. In this way, the user is enabled to purposefully bring about an investigation and, if appropriate, rectification of the alterations or the problems caused by the alterations and, in particular, to purposefully determine the causes of the alterations. In this way, fault finding processes that are often lengthy and complex according to the prior art can be considerably simplified and shortened. Furthermore, early recognition of faults can allow a timely intervention by the user which can at least reduce, in the best case even prevent, the effects of an alteration—recognized during the analysis—to the automation software on the operation of the technical device.

The automation device can be in particular a control device of an electrical drive system. Electrical drive systems make high demands on control devices of the type described herein, particularly as far as the real-time capability is concerned. At the same time, besides purely controlling one drive and/or a plurality of drives, the control devices in question have to provide a number of additional functionalities, such as enabling remote maintenance accesses via data connections, for example. The underlying software architectures of such automation devices are correspondingly complex with structures being necessary in order to be able to satisfy the different requirements in regard to the respective functionalities. However, the electrical drive systems are regularly an elementary part of the technical device, which is why interventions in the software of the automation device are regularly associated with extensive downtimes of the entire technical device. Lengthy fault finding processes therefore have a particularly adverse effect in particular in the case of such automation devices. Therefore, the system described herein for analyzing the software is advantageously usable precisely in the case of such automation devices.

BRIEF DESCRIPTION OF DRAWINGS

Further practical embodiments and advantages of the system described herein are set forth below in association with FIG. 1.

DETAILED DESCRIPTION OF VARIOUS EMBODIMENTS

An exemplary method can provide for a first method step 10 firstly to involve a start-up of a technical device. An automation device which is enabled to execute automation technology tasks using automation software that is executable by the automation device is a part of the technical device.

At a first point in time, succeeding the start-up 10 in the example shown, in a method step 12, analysis software stores a first copy of a first version of the automation software, the first version being stored on a data memory of the automation device at the first point in time, in a memory area provided therefor. After storing the first copy in method step 12, in the example shown, commencing routine operation is carried out as method step 14.

The method can provide, as in the example shown, that recognizing an operation event, in particular a security-relevant event, in method step 16, has the effect that, in a further method step 18, a second copy of a second version of the automation software is stored, which is stored in the data memory of the automation device at the second point in time selected as a result of the occurrence of the security-relevant event. The exemplary method provides, in other words, for the first copy to correspond to the first version of the automation software stored on the data memory of the automation device at the first point in time before the recognition of the security-relevant event, wherein the second copy corresponds to the second version of the automation software stored in the data memory of the automation device at the second point in time after the recognition of the security-relevant event.

In this context, the method can provide for the copies stored in method steps 12 and 18 to be forensic duplicates that are produced in particular using write blockers.

A further method step 20 can involve identifying an invariable part of the automation software. The parts, identified as invariable, of the two versions of the automation software that were stored as copies in method steps 12 and 18 are compared by the analysis software in a subsequent method step 22. In the exemplary method, the alterations to the invariable part of the automation software that were identified during the comparison in method step 22 are output to a user by way of example via a screen as user interface in a further step 24.

The features of the invention which are disclosed in the present description, in the drawing and also in the claims may be essential to the realization of the invention in its various embodiments both individually and in any desired combinations. The invention is not restricted to the embodiments described. It can be varied within the scope of the claims and taking account of the knowledge of the competent person skilled in the art.

The invention claimed is:

1. A method for analyzing an automation software of an automation device, comprising:
   enabling the automation device to execute automation technology tasks using automation software that is executable by the automation device, the automation software including programs and data with which the programs interact;
   storing a copy of a first version of the automation software in a memory area provided therefor at a first point on time using a write blocker that allows only read access to the first version automation software after the first point in time, the copy stored at the first point in time is an unaltered physical one-to-one copy of a data carrier and/or main memory of the automation device that includes an invariable part of the automation software which is not subject to any alterations during routine operation of the automation device; and
   comparing the invariable part of the first version of the automation software stored in the memory area at the first point in time with an invariable part of a second version of the automation software stored in the data memory of the automation device at a second point in time that is after commencement of the routine operation of the automation device.

2. The method as claimed in claim 1, wherein the copy of the software stored in the memory area is protected against changes and/or unrecognized changes which facilitates recognizing a cause of a change to the copy.

3. The method as claimed in claim 2, wherein the copy of the software stored in the memory area is protected against changes and/or unrecognized changes using a hash function and/or by an authentication feature.

4. The method as claimed in claim 1, wherein the automation software includes an operating system and/or a part of an operating system.

5. The method as claimed in claim 4, wherein the part of an operating system is a kernel and/or a library.

6. The method as claimed in claim 1, wherein the automation software includes a runtime environment and/or a part of a runtime environment.

7. The method as claimed in claim 6, wherein the runtime environment and/or a part of the runtime environment is at least one of: a runtime library, a standard library, a programming interface or a runtime variable.

8. The method as claimed in claim 1, wherein the automation software includes configuration data relating to technical design features of the automation device and/or of a technical device that includes the automation device.

9. The method as claimed in claim 8, wherein the technical design features are design features which are identical for all automation devices and/or technical devices of a specific type.

10. The method as claimed in claim 1, wherein the automation software includes parameterization data relating to technical parameters of the automation device and/or of a technical device that includes the automation device.

11. The method as claimed in claim 10, wherein the technical parameters are parameters which are individually defined for a specific automation device and/or technical device.

12. The method as claimed in claim 1, wherein the automation software includes application data relating to a specific use of the automation device and/or of a technical device that includes the automation device.

13. The method as claimed in claim 12, wherein the application data are dependent on a respective use of individual technical devices.

14. The method as claimed in claim 1, further comprising:
identifying a variable part of the automation software, which is subject to alterations during routine operation of the automation device.

15. The method as claimed in claim 14, wherein during identification of the invariable part of the automation software, operating systems, parts of an operating system, a runtime environment, parts of a runtime environment, configuration data, parameterization data, application data, hardware-bound addresses and/or issuers of a certificate are assigned to the invariable part of the automation software and/or wherein during identification of the variable part of the automation software, a current time of day, keys, certificates, non-hardware-bound addresses and/or data, cache files are assigned to the variable part of the automation software.

16. The method as claimed in claim 14, wherein comparing the first version and the second version is affected only on a basis of the invariable part and/or with the invariable part being disregarded.

17. The method as claimed in claim 1, wherein the first point in time is a point in time before recognition of a security-relevant event by an information technology security system and the second point in time is a point in time after the recognition of the security-relevant event.

18. The method as claimed in claim 17, wherein the information technology security system is an intrusion detection system and/or a virus scanner.

19. The method as claimed in claim 17, wherein the first point in time is a point in time before transferring a security copy of the automation software into the automation device.

20. The method as claimed in claim 1, wherein the first point in time is a point in time between conclusion of a start-up and commencement of routine operation of the automation device and/or of a technical device that includes the automation.

21. The method as claimed in claim 1, wherein the automation device is a control device of an electrical drive system.

22. The method as claimed in claim 1, wherein the automation device is a programmable logic controller.

23. The method as claimed in claim 1, wherein accessing the automation software includes creating the copy.

24. The method as claimed in claim 1, wherein the copy stored at the first point in time is a forensic duplicate of a hard disk of the automation device and/or of a memory card accommodated in the automation device.

* * * * *